Figure 1:
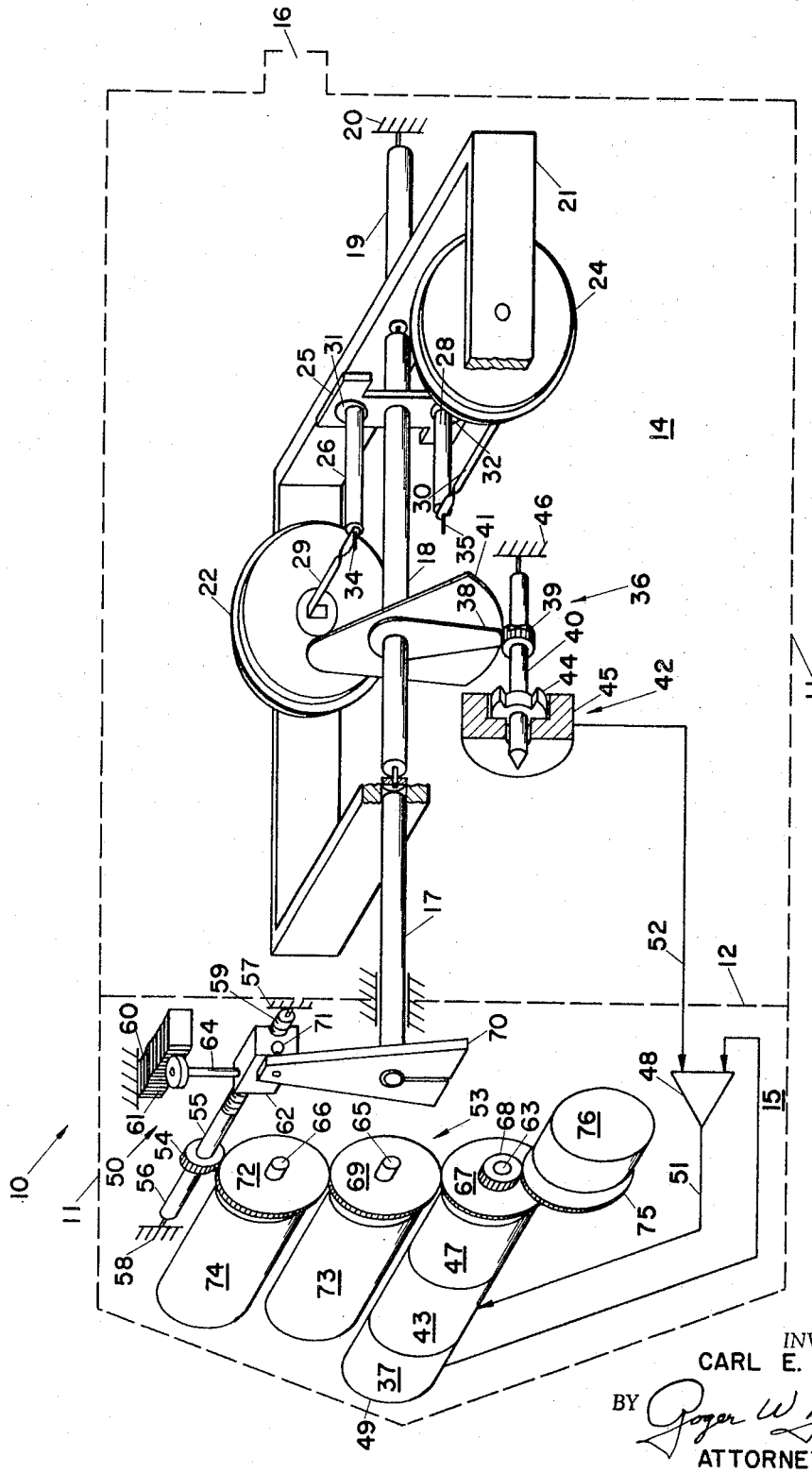

Feb. 21, 1967   C. E. JOHANSON   3,304,782
PRESSURE SENSOR

Filed Jan. 4, 1965    2 Sheets-Sheet 1

INVENTOR.
CARL E. JOHANSON
BY Roger W Nolan Jr
ATTORNEY

Feb. 21, 1967     C. E. JOHANSON     3,304,782
PRESSURE SENSOR

Filed Jan. 4, 1965     2 Sheets-Sheet 2

INVENTOR.
CARL E. JOHANSON
BY *Roger W Nolan Jr*
ATTORNEY

United States Patent Office 3,304,782
Patented Feb. 21, 1967

3,304,782
PRESSURE SENSOR
Carl E. Johanson, Davenport, Iowa, assignor to The Bendix Corporation, Davenport, Iowa, a corporation of Delaware
Filed Jan. 4, 1965, Ser. No. 422,940
15 Claims. (Cl. 73—386)

This invention relates to pressure responsive apparatus for providing an indication of a flight condition and more particularly to pressure sensitive apparatus for automatic altitude reporting systems.

Various flight conditions including altitude, rate of climb, rate of descent, Mach number, the several airspeed functions, and others vary as a function of altitude and/or dynamic pressures. Heretofore, the accuracies required of the indication of the flight condition have dictated the type and complexity of the apparatus structure. The sensitive elements which detect these pressures and the structure attached thereto for translating the sensed pressures to an indication of a flight condition are not suitable for all types of performance aircraft nor are they suitable for sensing both altitude and dynamic pressure.

An object of the present invention is to provide improved pressure responsive apparatus for providing an indication of a variety of flight conditions Another object of the present invention is to provide improved pressure responsive apparatus suitable for sensing both altitude and dynamic pressure.

A further object of the present invention is to provide improved pressure responsive apparatus which produces a highly accurate indication of a flight condition which is of a simple construction, light weight, and which can be produced at a relatively low cost The apparatus of the present invention may be employed in many mechanisms for determining an accurate indication of flight conditions but, for the sake of clearly describing the invention, it will be advantageous to describe the invention in relation to altitude sensing The invention should not be considered to be limited to altitude sensing in that, as heretofore mentioned, the invention has many applications in the art of sensing flight conditions The terminology used herein pertaining to altimeters is to have a meaning consistent with the meaning applied for the same terminology in "Tables and Data for Computing Airspeed, Altitudes, and Mach Numbers" published in 1953 by the Battelle Memorial Institute.

Heretofore the type of altimeters required for an aircraft have been determined by the performance characteristics of the aircraft. For high performance aircraft, complex systems were developed which included compensation for errors due to Mach number, temperature, errors of the system itself and others, whereas a low performance aircraft required only a reasonably simple straight-forward pressure indicator. In describing altimeter systems, they may be classed into three distinguishable groups based on the performance characteristics of the aircraft. In Group I would be altimeters for aircraft having an altitude range to 35,000 feet. In Group II would be altimeters for aircraft having an altitude range to 50,000 feet and a Mach limit of 0.9. In Group III would be altimeters for aircraft having an altitude range to 80,000 feet and a Mach limit of 2.5.

A still further object of the present invention is to provide a basic altitude pressure sensor adaptable for use in all types of altimeter systems.

A still further object of the present invention is to provide an altitude pressure sensor adaptable for use in a Group I type altimeter system.

A still further object of the present invention is to provide an altitude pressure sensor adaptable for use in a Group II type altimeter system wherein correction is made for errors in sensed altitude pressure due to Mach number variations.

In altimeter systems, errors are produced in the measurement and transmission of true pressure altitude. These errors may be called sensor errors and may be classed into three groups identified as errors in measured pressure, errors in the transmission of the pressure, and errors in the instrument itself. Further, attempts to compensate for sensor errors have resulted in adjustable means within the sealed portion of the sensor creating the disadvantage that the sensor seal must be broken for each adjustment made during sensor calibration and adjustments made prior to and after sensor installation.

A still further object of the present invention is to provide improved means for the correction of sensor errors including means for adjusting the sensor error correction means without breaking the sensor seal.

A still further object of the present invention is to provide an altitude pressure sensor mechanism having a mechanism frame acting as a portion of the mechanism differential.

A still further object of the present invention is to provide an altitude pressure sensor mechanism having the movement of the altitude pressure sensitive elements utilized for transmittal through a Geneva gear mechanism.

Certain of these objects are realized in the invention by the provision of a sensor having a differential frame member, pressure responsive means mounted on said member, means responsive to the movement of said pressure responsive means for transmitting the incremental movement thereof, sensor correction means responsive to the movement of said last mentioned means for positioning said differential frame member.

The foregoing and other objects and advantages of the invention will appear more fully hereinafter from a consideration of the detailed description which follows, taken together with the accompanying drawing wherein an embodiment of the invention is illustrated. It is to be expressly understood, however, that the drawing is for the purpose of illustration and description and is not to be construed as defining the limits of the invention.

FIGURE 1 of the drawing is a schematic showing of a pressure sensor embodying the invention.

Figure 2:
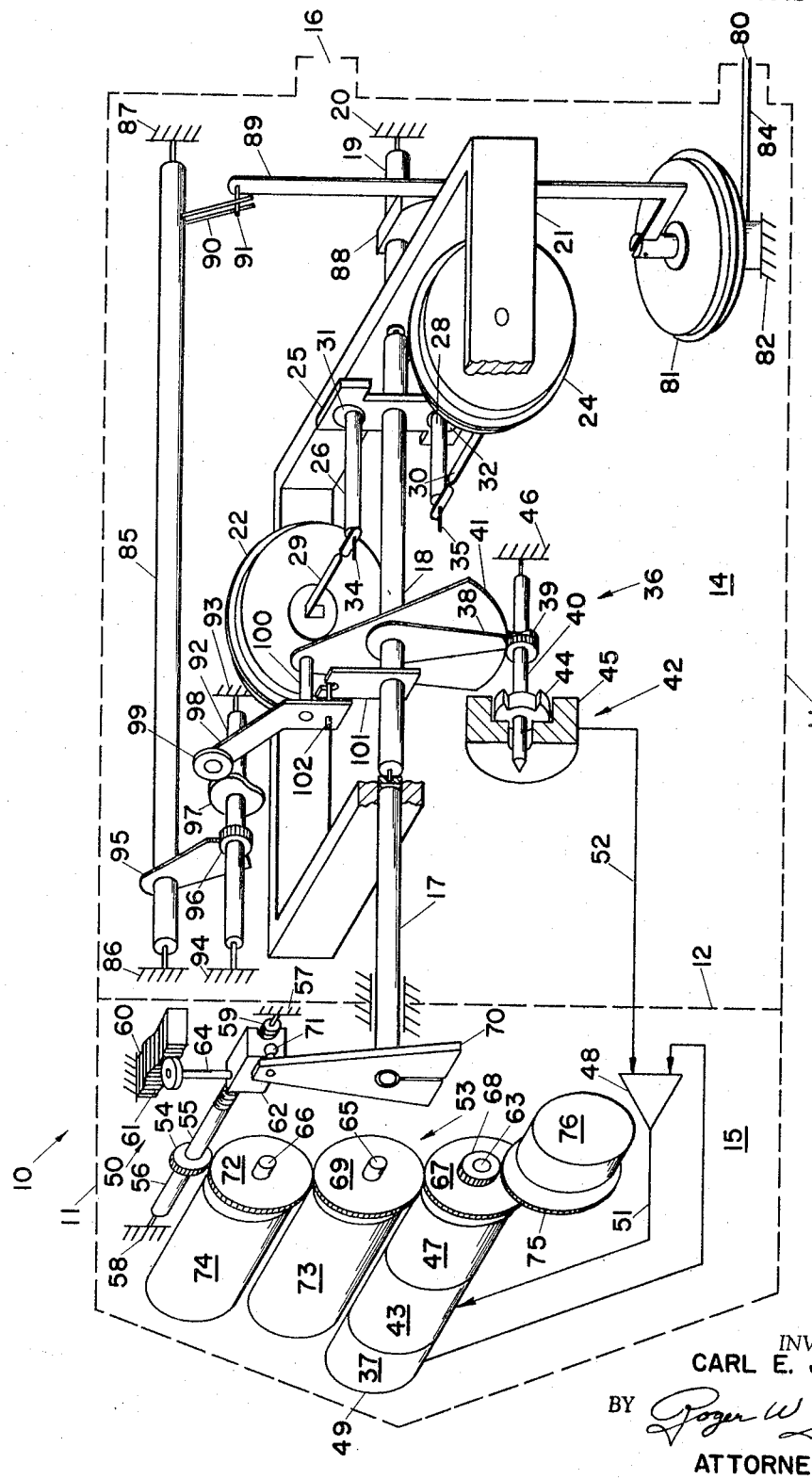

FIGURE 2 of the drawing is a schematic showing of an altitude pressure sensor of the Group II type.

Referring now to FIGURE 1 of the drawing, the numeral 10 designates a pressure sensor having a housing 11 within which all the elements of the sensor are enclosed. The housing 11 has an interior wall 12 which divides the interior of the housing into two chambers, pressure-tight sealed sensor chamber 14 and calibration chamber 15.

As heretofore stated, the present invention will be illustrated as used in the altimeter art and pressure sensor 10 will be designated an altitude sensor 10. The interior of sensor chamber 14 is subjected to indicate altitude pressure communicated through opening 16 by a static tube, not shown. Advantageously, it is apparent that pressure sensor 10 may be employed to detect dynamic (total) pressure and the sensor chamber 14 would be in communication with the Pitot line of the air vehicle through opening 16.

Differential frame and capsule support member 21 is disposed within sensor chamber 14 and mounted for rotational movement relative thereto by means of axially aligned shafts 17 and 19 fixed to frame member 21. Shaft 17 is mounted in interior wall 12 and shaft 19 is pivotally mounted in support 20 of housing 11. Main rocking shaft 18 is axially aligned with shafts 17 and 19 and pivotally mounted at both ends in frame member 21. Static pressure responsive capsules 22 and 24 are mounted on frame member 21 and connected to rocking shaft 18 by any suitable means. This means may advantageously be of the type disclosed in United States Patent No. 3,040,582 which was granted on June 26, 1962 to Alan A. Lorenz, and assigned to the Assignee of the present invention. As shown, this means comprises a motion transmitting element or arm 25, bimetallic elements 26 and 28 and links 29 and 30. Arm 25 is mounted on rocking shaft and has an opening at its outer ends to receive cylindrical mounting members 31 and 32 of elements 26 and 28, respectively. The outer ends 34 and 35 of elements 26 and 28 is of reduced diameter to receive the first ends of links 29 and 30, the second ends of links 29 and 30 are fixed to capsules 22 and 24, respectively.

Advantageously, the altitude sensor 10 includes a Geneva gear mechanism 36 which comprises Geneva sector gear 38 mounted on rocking shaft 18 and Geneva pinion gear 39 mounted on microsyn shaft 40. Sector gear 38 meshes with pinion gear 39 and overtravel of the microsyn shaft assembly 40, 44, 39 is prevented by means of Geneva locking disk 41 mounted on rocking shaft 18.

Advantageously, the altitude sensor 10 includes rotary signal generator 42, hereafter called a microsyn, having a microsyn rotor 44 mounted on the first end of microsyn shaft 40 and a microsyn stator 45 fixed to the housing 11 (not shown) and disposed to receive for rotational movement therein rotor 44. The second end of microsyn shaft 40 is supported by mounting 46 of housing 11 and disposed for rotation therein.

Disposed within calibration chamber 15 of housing 11 is amplifier 48, center tapped two-phase motor generator 49, and error correction mechanism 50. Motor generator 49 comprises generator 37, motor 43, and gear head 47. Conventional electrical means 51 and 52 connects amplifier 48 to motor 43 and microsyn 42, respectively, and conventional mechanical drive means 53 joins gear head 47 and pinion 54 of error correction mechanism 50.

Advantageously, error correction mechanism 50 comprises lead screw shaft 55 having a first end 56 mounted and disposed for movement in support 58 of housing 11 and having a threaded second end 59 disposed for pivotal movement in support 57 of housing 11. Pinion gear 54 is mounted on said first end 56 of said shaft 55. Calibration cam 60 is fixed to housing 11 (not shown) having a cam surface 61 designed to compensate for non-linearities developed by the altitude sensor 10. Nut 62 has cam follower 64 mounted thereon and is disposed to move axially along lead screw shaft 55 upon rotation of said shaft 55. Shaft 17 is axially aligned with main rocking shaft 18 and passed through interior wall 11, at which point a suitable pressure-tight seal of any conventional type (not shown) is provided. Differential frame arm 70, fixed to shaft 17, has follower 71 mounted thereon for slidable engagement with nut 62.

Gear train 53 may advantageously comprise shafts 63, 65, and 66. Each shaft 63, 64, and 65 is disposed for rotation in supports (not shown) in housing 11. Shaft 63 is fixed to gear head 47 and has spur gear 67 and pinion gear 68 mounted thereon. Spur gear 69 is mounted on shaft 65 and meshes with gear 67. Spur gear 72 is mounted on shaft 66 and meshes with gear 69 and pinion gear 54.

Advantageously, the altitude sensor 10 includes elements as heretofore described which function as a conventional differential. The function of the differential, to combine and add motion, includes the combination of the first input, rotation of shaft 17 and the second input, the rotation of rocking shaft 18. The rotation of rocking shaft 18 is proportional to indicated altitude and the rotation of shaft 17 is proportional to pressure altitude plus the algebraic sum of the altitude error resulting from the non-linearities of the elements of the altitude sensor 10. The output from the differential is provided by the rotation of microsyn shaft assembly 40, 39, 44, which rotation is zero when the rotation of shafts 55, 72, 69, 67 is proportional to true feet of altitude.

The Geneva transfer gear mechanism 36 provides substantial advantages in the altitude sensor 10 including the providing of a simple, reliable means for a high degree of sensitivity and to prevent ambiguity. The mechanism 36 provides for linear motion transfer from the main rocking shaft 18 to the microsyn rotor 44 for a preset maximum rotation of microsyn travel. For the purpose of an example, the preset maximum rotation is ±60° and a gear ratio of sector 38 to pinion 39 is 10:1. Thus for inputs of greater than 6° on rocking shaft 18 the microsyn rotor 44 is held fixed by the Geneva locking disk 41. During normal operations, the Geneva sector gear 38 and Geneva pinion gear 39 remained nulled at the center of the transfer mechanism 36. The "nulls" on the microsyn 42 are 90° apart. Therefore, any combination of pressure change and thus rotation of shaft 18 will maintain a voltage of proper phase to drive the system to null. Advantageously the pressure sensor 10 is protected so that no damage will occur if step pressure changes of the full range are experienced.

Advantageously, the altitude sensor 10 of the present invention employs a single loop servo system in which an error signal is generated in the microsyn 42. The details of amplifier 48 and motor generator 49 are not shown. The amplifier may advantageously comprise a simple A.C. differential amplifier which receives the signal from the microsyn 42. The power stage of the amplifier drives the center tapped two-phase motor 43. The servo amplifier may consist of a single transistor preamp stage, a pair of coupling transistors, and a Class B output stage. The rate generator signal from generator 37 is coupled back to the amplifier to provide damping. A D.C. bias voltage required for the servo amplifier may be provided from a solid state power supply.

The segmented calibration cam 60 is advantageously included within the servo loop to eliminate by correction the nonlinearities or component errors created within the altitude sensor 10. It can be seen that cam 60 may be a cut cam as well as segmented as heretofore described. Within the sensor 10 many errors may be created by nonlinearity of the capsules 22 and 24, the linkage mechanism from the capsules 22 and 24 to the microsyn 42, and the position of the segments of cam 60; resolution errors, the magnitude of the input change required to produce a change in output, in the servo loop, microsyn 42 and capsules 22 and 24; friction errors, the error caused by friction in the components outside the servo loop; hysteresis errors, the error covered by the elastic behavior of the capsules 22 and 24; position and vibration errors, errors caused by unsymmetrical location of components, advantageously substantially eliminated by the symmetrical location of capsules 22 and 24; temperature errors, errors created by the expansion and contraction of the sensor 10 elements, advantageously substantially eliminated by bimetallic elements 26 and 28.

Generally, in summary, the altitude sensor consists of pressure capsules and a linkage mechanism which feed as input into a closed servo loop. The error signal generated at the microsyn energized the motor which drives the system back to the null condition such that the error signal is eliminated. The generator provides a voltage proportional to speed to provide stability for the system. The calibration cam inside the loop is used to eliminate the non-linearities within the system.

In operation of the altitude sensor 10, the sensor chamber 14 is in fluid communication with the static pressure line of the air vehicle through opening 16 in the housing 11. Assume that a small step decrease in pressure in chamber 14 has occurred as a result of an increase in altitude of the air vehicle. This causes expansion of capsules 22 and 24 and rotation of main shaft 18. The rocking shaft 18 motion causes the microsyn rotor 44 to be displaced by the motion transfer through the Geneva gear mechanism 36. This displacement in the microsyn 42 generates an error signal in the microsyn 42 which is amplified in amplifier 48 and sent to the control phase of servo motor 43. The servo motor 43 through drive means 53 and pinion 54 drives the lead screw 55. Rotation of lead screw 55 advances nut 62 which rotates sector 70 and thus shaft 17. Frame 21, attached to shaft 17, is thus driven in the direction to reduce the error voltage of microsyn 42. The servo feedback is corrected as the follower 64 of nut 62 is advanced with the rotation of lead screw 55 and servo feedback is corrected at the lead screw 55 by means of the segmented calibration cam 60 which, as heretofore mentioned, corrects for any non-linearities or component errors in the altitude sensor 10. As can be readily seen, for changes in pressure within sensor chamber 14 other than a step input, the mechanism provides for continuous control.

It can be readily seen that the altitude sensor 10 of FIGURE 1 above described is the basic sensor shown in FIGURE 2 of the drawing. All the numeral designations for FIGURE 1 are also found in FIGURE 2.

Referring now in particular to FIGURE 2, there is shown the basic altitude sensor of FIGURE 1 with additional means to compensate for errors in sensed altitude pressure due to variations in Mach number. The altitude sensor may be advantageously employed as a Group II type altimeter.

The altitude sensor 10 of FIGURE 2 has an impact (total) pressure opening 80 in housing 11 which is in communication with the Pitot line (not shown) of the air vehicle. Disposed within sensor chamber 14 is differential pressure responsive capsule 81 which is mounted on support 82 of housing 11. Capsule 81 is in fluid communication with opening 80 by means of tubing 84. Thereby, capsule 81 is subjected to impact pressure in its interior and is subjected to indicated altitude pressure on its exterior which is the pressure within sensor chamber 14.

Mach shaft 85 is disposed within chamber 14 and parallel to main rocking shaft 18 and has its ends mounted for rotation in supports 86 and 87 of housing 11. Mach computation cam 88 is mounted on shaft 19 which rotates with frame 21 as a function of true altitude. Follower link 89 is fastened to the differential pressure capsule 81 and moves with capsule 81 as a function of impact pressure. Link 89 bears against the follower cam 88. Follower link 89 is disposed to rotate shaft 85 by means of forked member 90 fixed to shaft 85 and having its open end disposed to slidably receive pin 91 of link 89. Cam 88 is cut to modify the motion of link 89 whereby the angular movement of member 90 is determined by the degree of expansion of capsule 81 and the rotational position of shaft 19. Advantageously, the cam 88, link 89, member 90 and pin 91 are designed to compute Mach number, whereby the rotation of shaft 85 is proportional to Mach number.

Disposed within chamber 14 is cam shaft 92 parallel to shaft 85 and mounted in supports 93 and 94 of housing 11 for rotational movement therein. Sector gear 95 is mounted on shaft 85 and is disposed to mesh with pinion gear 96 mounted on shaft 92. Pressure defect correction cam 97 is mounted on cam shaft 92 and is rotated as shaft 85 is rotated by means of gears 95 and 96. Therefore, the pressure defect information can be stored on the cam 92 as a function of rotation (Mach number). It is now apparent that static errors due to Mach number for a particular air vehicle can be corrected by the means heretofore described. For particular air vehicles, the correction may only be optimized, therefore, the rotation of shaft 85 may not be proportional to Mach number only, but may be programmed to rotate cam 97 to a proper position for the input pressure conditions.

Cam follower arm 98 is an L shaped arm having cam follower 99 mounted at one end for sliding contact with pressure defect cam 97. The bottom end of arm 98 has pivot shaft 100 fixed thereto and fixed to Geneva locking disk 41. Rocking shaft arm 101 is mounted on main rocking shaft 18 and has a second U shaped end disposed to slidably receive pin 102 which is fixed to the outer end of L shaped arm 98. The rotation of the pressure defect cam 97 causes the cam follower arm 98 to rotate about pivot shaft 100. The rotation causes an angular displacement of Geneva sector gear 38 and Geneva locking disk 41 with respect to main rocking shaft 18 and rocking shaft arm 101.

In operation of the altitude sensor shown in FIGURE 2, the sensor chamber 14 is in fluid communication with static pressure line of the air vehicle through opening 16 and differential pressure responsive capsule 81 is in fluid communication with the Pitot line of the air vehicle by means of opening 80 and tube 84. Generally, the sensor 10 converts the combined inputs of static pressure and impact pressure into a pressure altitude output which has been corrected for a predetermined pressure error defect.

In detail, assume that a small step decrease in pressure in chamber 14 has occurred as a result of an increase in altitude of the air vehicle. This operation has been described above for FIGURE 1 and will not be redescribed here. Now assume that a change in static or impact pressure occurs, thus resulting in a small deflection of differential pressure responsive capsule 81. The deflection of the capsule 81 is approximately proportional to the log of the difference of impact and static pressure. As heretofore mentioned, the motion of frame member 21 is proportional to altitude and thus Mach computation cam 88 which is directly coupled to the frame 21 rotates as a function of altitude. The link 89, member 90 and pin 91 are designed to compute Mach numbers. Thus movement of capsule 81 results in rotation of shaft 85 which is proportional to Mach number. Pressure defect information is stored on pressure defect cam 97. Cam 97 is rotated with shaft 85 by means of sector gear 95, pinion gear 96 and cam shaft 92 on which cam 97 is mounted. The rotation of cam 97 causes arm 98 to rotate about pivot shaft 100 which is fixed to the assembly of locking disk 41 and sector 38. It is apparent from the above description that the Mach correction is accomplished by a mechanism which is equivalent to a differential. This rotation causes an angular displacement of disk 41 and sector 38 with respect to main rocking shaft 18. Since the servo mechanism continually repositions the microsyn 42 to a null position as heretofore described, the disk 41 and sector 38 are effectively stationary and the displacement caused by the movement of capsule 81 and thus the rotation of arm 98 creates a rotation of aneroid frame 21. This rotation is directly proportional to true feet of pressure altitude.

Referring now to FIGURES 1 and 2, it has been heretofore shown that the rotation of lead screw shaft 55 is directly proportional to true pressure altitude. Therefore, it can be readily seen that the present invention may advantageously employ a wide variety of means for transmitting signals of true pressure altitude to indicating or utilizing apparatus. Advantageously, there is shown in FIGURES 1 and 2 means for providing a signal in analog form for altitude indication which comprises synchro transmitters 73 and 74 fixed to shafts 65 and 66, respectively. There is shown two transmitters 73 and 74 which provide two independent signals which may be utilized to provide altitude indication at two different locations in an air vehicle. It is readily seen that only one transmitter is necessary to provide an analog output which may be used at one or more locations in the air vehicle. Advantageously, there is shown in FIGURES 1 and 2 a second means for providing an indication of true pressure altitude which comprises a shaft-angle encoder 75 which is connected to pinion gear 68 by means of spur gear 76 and a shaft (not shown). Gear 76 is mounted on said shaft and meshes with gear 68, said shaft is disposed to be received by encoder 75. Shaft angle encoder provides a digital output which is a function of true pressure altitude, this signal may advantageously be utilized by a transponder of an air vehicle for transmission to a ground control.

As heretofore illustrated, the performance characteristic of an aircraft determines the type of altimeter required. It has been shown that the basic altitude sensor of FIGURE 1 would adequately provide an indication of true pressure altitude for low performance aircraft, generally aircraft of the Group I type heretofore mentioned. It is also evident that a medium performance aircraft of the Group II type would advantageously be served by the sensor shown in FIGURE 2 wherein the basic sensir of FIGURE 1 is modified to include compensation for errors due to Mach number variations. For Group III type aircraft, high accuracies are required due to the performance characteristics of the aircraft. For this group the basic sensor shown in FIGURE 1 may be employed to sense both impact (total) pressure and static pressure and combined in a manner similar to that of FIGURE 2, thereby giving a highly accurate sensing of true altitude pressure. It is understood that the system descriptions and grouping described in this paragraph should in no way limit the invention shown in FIGURES 1 and 2, but are used for the purpose of illustration and showing the advantages and versatility of the altitude sensor described herein.

While the pressure sensor shown in the drawings is of the construction shown and described, it is understood that the instant invention is not limited to any particular form or construction. Moreover, other changes and modifications of the novel pressure sensor contemplated herein may be made by those skilled in the art without departing from the scope of the instant invention.

I claim:
1. A pressure sensitive flight conditioin sensor for producing a true signal of a flight condition which varies as a function of the sensed flight condition comprising
   (a) a support,
   (b) first means for producng a signal proportional in value to said sensed flight condition including
      (1) a shaft having the ends thereof disposed for rotation in said support,
      (2) pressure responsive means mounted on said support and connected to said shaft for rotating said shaft as a function of said sensed flight condition,
   (c) second means for correcting the errors in said sensed flight condition including
      (1) error correction means for providing a true signal of said flight condition and
      (2) means for driving said error correction means in response to the rotation of said shaft,
   (d) means interconnecting said error correction means and said support for rotating said support as a function of the true flight condition.

2. A pressure sensitive flight condition sensor for producing a true signal of a flight condition which varies as a function of the sensed flight condition comprising
   (a) support,
   (b) first means for producing a signal proportional in value to said sensed flight condition including
      (1) a shaft having the ends thereof disposed for rotation in said support,
      (2) pressure responsive means mounted on said support,
      (3) means interconnecting said shaft and said pressure responsive means whereby said shaft rotates as a function of the expansion of said pressure responsive means in response to variations in the sensed flight condition,
   (c) second means for correcting the errors in said sensed flight condition including
      (1) a cam,
      (2) a cam follower disposed for movement along the surface of said cam,
      (3) means for driving said cam follower in response to the rotation of said shaft,
   (d) means interconnecting said cam follower and said support for rotating said support as a function of the true flight condition.

3. A pressure sensitive flight condition sensor for producing a true signal of a flight condition which varies as a function of the sensed flight condition comprising
   (a) a support,
   (b) first means for producing a signal proportional in value to said sensed flight condition including
      (1) a shaft having the ends thereof disposed for rotation in said support,
      (2) pressure responsive means mounted on said support,
      (3) means interconnecting said shaft and pressure responsive means whereby said shaft rotates as a function of the expansion of said pressure responsive means in response to variations in the sensed flight condition,
   (c) second means for correcting the errors in said sensed flight condition including
      (1) a cam,
      (2) a cam follower disposed for movement along the surface of said cam,
      (3) motion transfer means fixed to said shaft,
      (4) rotary signal generator means responsive to said motion transfer means for providing a signal which is a function of the rotation of said shaft,
      (5) means responsive to said signal for driving said cam follower,
   (d) means interconnecting said cam follower and said support for rotating said support as a function of the true flight conditions.

4. A pressure sensitive flight condition sensor for producing a true signal of a flight condition which varies as a function of the sensed flight condition comprising
   (a) a housing having a pressure inlet,
   (b) a rocking shaft,
   (c) a frame member mounted on said shaft and disposed in said housing and rotatable relative to said housing,
   (d) a pair of pressure responsive capsules mounted on said frame member and responsive to variations in said flight condition,
   (e) a main shaft axially aligned with said rocking shaft and having the ends thereof disposed for rotation in said frame member,
   (f) temperature compensating linkage means connecting said pressure responsive capsules and said main shaft for rotating said main shaft as a function of the expansion of said pressure responsive capsules,
   (g) means disposed in said housing for correcting the errors in said sensed flight condition including
      (1) Geneva transfer gear mechanism having a sector gear mounted on said main shaft and a pinion gear disposed to mesh with said sector gear,
      (2) a cam fixed relative to said housing having a calibrated cam surface cut to compensate for error in the sensed flight condition,
      (3) a lead screw,
      (4) a cam follower mounted for movement on said lead screw and disposed for following movement along said cam surface,
      (5) rotary signal generator means responsive to the rotation of said pinion gear of said Geneva transfer gear means for producing an error signal which is a function of the rotation of said main shaft,
      (6) an amplifier,
      (7) a servo motor, said error signal amplified by said amplifier and fed to said servo motor, (8) means interconnecting said servo motor and said lead screw for rotating said lead screw in response to the error signal fed to said servo motor whereby said cam follower is advanced along said cam surface, (h) means mounted on said rocking shaft for following said cam follower whereby said frame member is rotated as a function of the true flight condition.

5. A pressure sensitive altitude sensor for producing a true signal of altitude pressure which varies as a function of indicated altitude pressure comprising (a) a support, (b) first means for producing a signal proportional in value to said indicated altitude pressure including
  (1) a shaft having the ends thereof disposed for rotation in said support,
  (2) static pressure responsive means mounted on said support and connected to said shaft for rotating said shaft as a function of said indicated altitude pressure, (c) second means for correcting the errors in said indicated altitude pressure including
  (1) error correction means for providing a true signal of said altitude pressure and
  (2) means for driving said error correction means in response to the rotation of said shaft, (d) means interconnecting said error correction means and said support for rotating said support as a function of the true altitude pressure.

6. A pressure sensitive altitude sensor for producing a true signal of altitude pressure which varies as a function of indicated altitude pressure comprising (a) a support, (b) first means for producing a signal proportional in value to said indicated altitude pressure including
  (1) a shaft having the ends thereof disposed for rotation in said support,
  (2) static pressure responsive means mounted on said support,
  (3) means interconnecting said shaft and said static pressure responsive means whereby said shaft rotates as a function of the expansion of said static pressure responsive means in response to variations in indicated altitude pressure, (c) second means for correcting the errors in said indicated altitude pressure including
  (1) a cam,
  (2) a cam follower disposed for movement along the surface of said cam,
  (3) means for driving said cam follower in response to the rotation of said shaft, (d) means interconnecting said cam follower and said support for rotating said support as a function of the true altitude pressure.

7. A pressure sensitive altitude sensor for producing a true signal of altitude pressure which varies as a function of indicated altitude pressure comprising (a) a support, (b) first means for producing a signal proportional in value to said indicated altitude pressure including
  (1) a shaft having the ends thereof disposed for rotation in said support,
  (2) static pressure responsive means mounted on said support,
  (3) means interconnecting said shaft and said static pressure responsive means whereby said shaft rotates as a function of the expansion of said static pressure responsive means in response to variations in indicated altitude pressure, (c) second means for correcting the errors in said indicated altitude pressure including
  (1) a cam,
  (2) a cam follower disposed for movement along the surface of said cam,
  (3) motion transfer means fixed to said shaft,
  (4) rotary signal generator means responsive to said motion transfer means for providing a signal which is a function of the rotation of said shaft,
  (5) means responsive to said signal for driving said cam follower, (d) means interconnecting said cam follower and said support for rotating said support as a function of the true altitude pressure.

8. A pressure sensitive altitude sensor for producing a true signal of altitude pressure which varies as a function of indicated altitude pressure comprising (a) a housing having a pressure inlet, (b) a rocking shaft, (c) a frame member mounted on said shaft and disposed in said housing and rotatable relative to said housing, (d) a pair of static pressure responsive capsules mounted on said frame member and responsive to variations in indicated altitude pressure, (e) a main shaft axially aligned with said rocking shaft and having the ends thereof disposed for rotation in said frame member, (f) temperature compensating linkage means connecting said static pressure responsive capsules and said main shaft for rotating said main shaft as a function of the expansion of said static pressure responsive capsules, (g) means disposed in said housing for correcting the errors in said indicated altitude pressure including
  (1) Geneva transfer gear mechanism having a sector mounted on said main shaft and a pinion gear disposed to mesh with said sector gear,
  (2) a cam fixed relative to said housing having a calibrated cam surface cut to compensate for error in the sensed flight condition,
  (3) a lead screw,
  (4) a cam follower mounted for movement on said lead screw and disposed for following movement along said cam surface,
  (5) rotary signal generator means responsive to the rotation of said pinion gear of said Geneva transfer gear means for producing an error signal which is a function of the rotation of said main shaft,
  (6) an amplifier,
  (7) a servo motor, said error signal amplified by said amplifier and fed to said servo motor,
  (8) means interconnecting said servo motor and said lead screw for rotating said lead screw in response to the error signal fed to said servo motor whereby said cam follower is advanced along said cam surface, (h) means mounted on said rocking shaft for following said cam follower whereby said frame member is rotated as a function of the true altitude pressure.

9. A pressure sensitive altitude sensor for producing a signal indicative of the actual altitude in the circumstance in which the measured static pressure differs from actual static pressure comprising:

(a) means for providing a first signal variable as a function of static pressure, (b) means for providing a second signal variable as a function of the difference between measured static and dynamic pressures, (c) means for combining said first and second signals for producing a Mach number correction signal variable as a function of Mach number, (d) means for producing a corrected altitude signal comprising means for altering said first signal in a degree proportional for any combination of values of said first signal and said second signal to the difference between the value of said first signal and the value it would have if said measured static pressure equalled actual static pressure, (e) an altitude signal readout device connected to respond to said corrected altitude signal, and (f) calibration means comprising a servo loop excluding each of said prior mentioned means and comprising means including a calibration cam and follower sensitive to the signal applied to said readout device to provide a calibration signal and means for altering said corrected altitude signal as a function of said calibration signal.

10. A pressure sensitive altitude sensor for producing a true signal of altitude pressure which varies as a function of indicated altitude pressure comprising (a) a support, (b) a shaft having the ends thereof disposed for rotation in said support, (c) first means for producing a signal proportional in value to said indicated altitude pressure including (1) first pressure responsive means mounted on said support and connected to said shaft for rotating said shaft to a position which is a function of said indicated altitude pressure, (d) second means for producing a signal proportional in value to a flight condition other than indicated altitude pressure including, (1) second pressure responsive means linked to said shaft for rotating said shaft to a position which is a predetermined function of said flight condition, (e) third means sensitive to the position of said shaft for correcting the errors in said indicated altitude pressure including (1) error correction means for providing a true signal of said altitude pressure and (2) means for driving said error correction means in response to the rotation of said shaft, (f) means interconnecting said error correction means and said support for rotating said support as a function of the true altitude pressure.

11. A pressure sensitive altitude sensor for producing a true signal of altitude pressure which varies as a function of indicated altitude pressure comprising (a) a support, (b) a shaft having the ends thereof disposed for rotation in said support, (c) first means for producing a signal proportional in value to said indicated altitude pressure including (1) static pressure responsive means mounted on said support and connected to said shaft for rotating said shaft to a position which is a function of said indicated altitude pressure, (b) second means for producing a signal proportional in value to Mach number including (1) differential pressure responsive means linked to said shaft for rotating said shaft to a position which is a predetermined function of said Mach number, (e) third means sensitive to the position of said shaft for correcting the errors in said indicated altitude pressure including (1) error correction means for providing a true signal of said altitude pressure and (2) means for driving said error correction means in response to the rotation of said shaft, (f) means interconnecting said error correction means and said support for rotating said support as a function of the true altitude pressure.

12. A pressure sensitive altitude sensor for producing a true signal of altitude pressure which varies as a function of indicated altitude pressure comprising (a) a support, (b) a shaft having the ends thereof disposed for rotation in said support, (c) first means for producing a signal proportional in value to said indicated altitude pressure including (1) static pressure responsive means mounted on said support, (2) means interconnecting said shaft and said static pressure responsive means whereby said shaft rotates as a function of the expansion of said static pressure responsive means in response to variations in indicated altitude pressure, (d) second means for producing a signal proportional in value to Mach number including (1) differential pressure responsive means, (2) Mach computing means positioned by means of said support, (3) means responsive to either one of the movement of said differential pressure means or said Mach computing means for rotating said shaft to a position which is a predetermined function of Mach number, (e) third means sensitive to the position of said shaft for correcting the errors in said indicated altitude pressure including (1) a cam, (2) a cam follower disposed for movement along the surface of said cam, (3) means for driving said cam follower in response to the rotation of said shaft, (f) means interconnecting said cam follower and said support for rotating said support as a function of the true altitude pressure.

13. A pressure sensitive altitude sensor for producing a true signal of altitude pressure which varies as a function of indicated altitude pressure including variations incident to changes in Mach number comprising, (a) a support, (b) shaft having the ends thereof disposed for rotation in said supports, (c) first means for producing a signal proportional in value to indicated altitude pressure including (1) static pressure responsive means mounted on said support, (2) means interconnecting said shaft and said static pressure responsive means whereby said shaft rotates as a function of the expansion of said static pressure responsive means in response to variations in indicated altitude pressure, (d) second means for producing a signal proportional in value to Mach number including (1) differential pressure responsive means, (2) Mach computing means positioned by means of said support, (3) means responsive to either one of the movement of said differential pressure means or said Mach computing means for rotating said shaft to a position which is a predetermined function of Mach number, (e) third means sensitive to the position of said shaft for correcting the errors in said indicated altitude pressure including (1) a cam, (2) a cam follower disposed for movement along the surface of said cam, (3) motion transfer means fixed to said shaft, (4) rotary signal generator means responsive to said motion transfer means for providing a signal which is a function of the rotation of said shaft, (5) means responsive to said signal for driving said cam follower, (f) means interconnecting said cam follower and said support for rotating said support as a function of the true altitude pressure.

14. A pressure sensitive altitude sensor for producing a true signal of altitude pressure which varies as a function of indicated altitude pressure including variations incident to changes in Mach number comprising,
  (a) a support,
  (b) a shaft having the ends thereof disposed for rotation in said supports,
  (c) first means for producing a signal proportional in value to indicated altitude pressure including
    (1) static pressure responsive means mounted on said support,
    (2) means interconnecting said shaft and said static pressure responsive means whereby said shaft rotates as a function of the expansion of said static pressure responsive means in response to variations in indicated altitude pressure,
  (d) second means for producing a signal proportional in value to Mach number including
    (1) differential pressure responsive means,
    (2) Mach computing means positioned by means of said support,
    (3) a Mach shaft,
    (4) linkage means connecting said Mach shaft and said differential pressure responsive means and disposed to be positioned by means of said Mach computing means, said linkage means responsive to either one of the movement of said differential pressure means or said Mach computing means for rotating said Mach shaft to a position which is a predetermined function of Mach number,
  (e) means sensitive to the position of said Mach shaft for rotating said shaft to a proportionally corresponding position,
  (f) third means sensitive to the position of said shaft for correcting the errors in said indicated altitude pressure including
    (1) a cam,
    (2) a cam follower disposed for movement along the surface of said cam,
    (3) motion transfer means fixed to said shaft,
    (4) rotary signal generator means responsive to said motion transfer means for providing a signal which is a function of the rotation of said shaft,
    (5) means responsive to said signal for driving said cam follower,
  (g) means interconnecting said cam follower and said support for rotating said support as a function of the true altitude pressure.

15. A pressure sensitive altitude sensor for producing a true signal of indicated altitude pressure which varies as a function of indicated altitude pressure including variations incident to changes in Mach number comprising
  (a) a housing having a static pressure inlet and a total pressure inlet,
  (b) a rocking shaft,
  (c) a frame member mounted on said shaft and disposed in said housing and rotatable relative to said housing,
  (d) a pair of pressure responsive capsules mounted on said frame member and responsive to variations in said altitude pressure communicated through said static pressure inlet,
  (e) a main shaft axially aligned with said rocking shaft and having the ends thereof disposed for rotation in said frame member,
  (f) temperature compensating linkage means connecting said pressure responsive capsules and said main shaft for rotating said main shaft as a function of the expansion of said pressure responsive capsules,
  (g) means for producing a signal proportional in value to Mach number including
    (1) differential pressure responsive capsule mounted on said housing and having the interior thereof in fluid communication with said total pressure inlet,
    (2) a Mach computing cam mounted on said rocking shaft,
    (3) a Mach shaft substantially parallel to said rocking shaft and said main shaft,
    (4) linkage means connecting said Mach shaft and said differential pressure responsive capsule and disposed to be positioned by means of said Mach computing cam, said linkage means responsive to either one of the movement of said differential pressure capsule or said Mach computing cam for rotating said Mach shaft to a position which is a predetermined function of Mach number,
  (h) means sensitive to the position of said Mach shaft for rotating said main shaft to a position which is a function of the position of said Mach shaft including pressure defect correction means,
  (i) means sensitive to the position of said main shaft disposed in said housing for correcting the errors in said indicated altitude pressure including
    (1) Geneva transfer gear mechanism having a sector gear mounted on said main shaft and a pinion gear disposed to mesh with said sector gear,
    (2) a cam fixed relative to said housing having a calibrated cam surface cut to compensate for error in the indicated altitude pressure,
    (3) a lead screw,
    (4) a cam follower mounted for movement on said lead screw and disposed for following movement along said cam surface,
    (5) rotary signal generator means responsive to the rotation of said pinion gear of said Geneva transfer gear means for producing an error signal which is a function of the rotation of said main shaft,
    (6) an amplifier,
    (7) a servo motor, said error signal amplified by said amplifier and fed to said servo motor,
    (8) means interconnecting said servo motor and said lead screw for rotating said lead screw in response to the error signal fed to said servo motor whereby said cam follower is advanced along said cam surface,
  (j) means mounted on said rocking shaft for following said cam follower, whereby said frame member is rotated as a function of the true altitude pressure.

References Cited by the Examiner
UNITED STATES PATENTS 3,239,140   3/1966   Armstrong _____ 73—182 X
3,242,737   3/1966   De Grande et al. _____ 73—387

LOUIS R. PRINCE, Primary Examiner.

D. O. WOODIEL, Assistant Examiner.